(12) United States Patent
Wilson

(10) Patent No.: US 9,205,447 B2
(45) Date of Patent: Dec. 8, 2015

(54) LIQUID COATING

(76) Inventor: Ken Wilson, San Diego, CA (US)

( * ) Notice: Subject to any disclaimer, the term of this patent is extended or adjusted under 35 U.S.C. 154(b) by 0 days.

(21) Appl. No.: 13/427,307

(22) Filed: Mar. 22, 2012

(65) Prior Publication Data

US 2013/0095247 A1   Apr. 18, 2013

Related U.S. Application Data

(60) Provisional application No. 61/547,609, filed on Oct. 14, 2011.

(51) Int. Cl.
| | | |
|---|---|---|
| *B05C 1/08* | (2006.01) | |
| *B05D 3/12* | (2006.01) | |
| *G02B 1/10* | (2015.01) | |
| *B05D 1/40* | (2006.01) | |

(52) U.S. Cl.
CPC .............. *B05C 1/0808* (2013.01); *G02B 1/105* (2013.01); *B05D 1/40* (2013.01)

(58) Field of Classification Search
None
See application file for complete search history.

(56) References Cited

U.S. PATENT DOCUMENTS

| | | | | |
|---|---|---|---|---|
| 2,167,063 | A * | 7/1939 | Brand | 118/224 |
| 2,398,506 | A * | 4/1946 | Rogers | 359/487.05 |
| 5,410,773 | A * | 5/1995 | Forkner | 15/230.11 |
| 7,279,438 | B1 * | 10/2007 | Ruid et al. | 442/180 |
| 2004/0111818 | A1 * | 6/2004 | Ma | 15/230.11 |
| 2007/0003650 | A1 * | 1/2007 | Schroeder | 425/71 |

* cited by examiner

*Primary Examiner* — Charles Capozzi
(74) *Attorney, Agent, or Firm* — Foley & Lardner LLP

(57) ABSTRACT

Devices and methods for liquid coating are disclosed.

13 Claims, 4 Drawing Sheets

FRONT VIEW

TROUGHS

SIDE VIEW

LIQUID COATING

CROSS-REFERENCE TO RELATED APPLICATION

This application claims priority to provisional application No. 61/547,609, filed Oct. 14, 2011, which is hereby incorporated herein by reference.

SUMMARY

Devices and methods for liquid coating are disclosed.

BACKGROUND

The sunglass industry has been making curved lenses since the early 1900's through molding, casting or forming. The materials that have been used are glass, CR39, Polycarbonate, Polyurethane, acrylic and more. The technology in the curved eyewear market for sunglasses has greatly improved since the mid 1990's.

Polarized sunglasses have also been around for a long time and some of the first polarized filters were made in the early 1900's by Edwin H. Land, the founder of the Polaroid Corporation. Mr. Land developed a way to spread liquid quinine crystals with a north and south polar axis onto thin film by using magnets. Later the film process was improved by using stretched PVA Polyvinyl alcohol soaked in iodine. Solid, stable pieces of film were later used for different needs, such as sunglass lenses. There have been many techniques used to laminate polarized film between two surface materials. One of the main challenges is that sunglass frames are made from metal.

When a sunglass lens is cut and installed into a metal sunglass frame, the lens can occasionally get caught on the edge causing the lens to delaminate and eventually completely separate from the two substrates. It is common for sunglass lenses to delaminate due to extreme heat exposure, wherein the glue used in the lamination process becomes detached.

One of the most important components of polarized film is the quality and thickness of the end product. Polarized film is graded by its filtration and its efficiency. The efficiency is done by taking two pieces of polarized film and crossing them in front of each other. Then a light meter is set between the material to measure how much light passes through. The best result is 100% efficiency, which means 0 percent of light passes through the two films when crossed at a perfect 90 degree angle.

There is a need in the art to create a polarized filter from a liquid crystal and, in addition, control the thickness and apply it to a curved surface.

DETAILED DESCRIPTION

Figure 1:
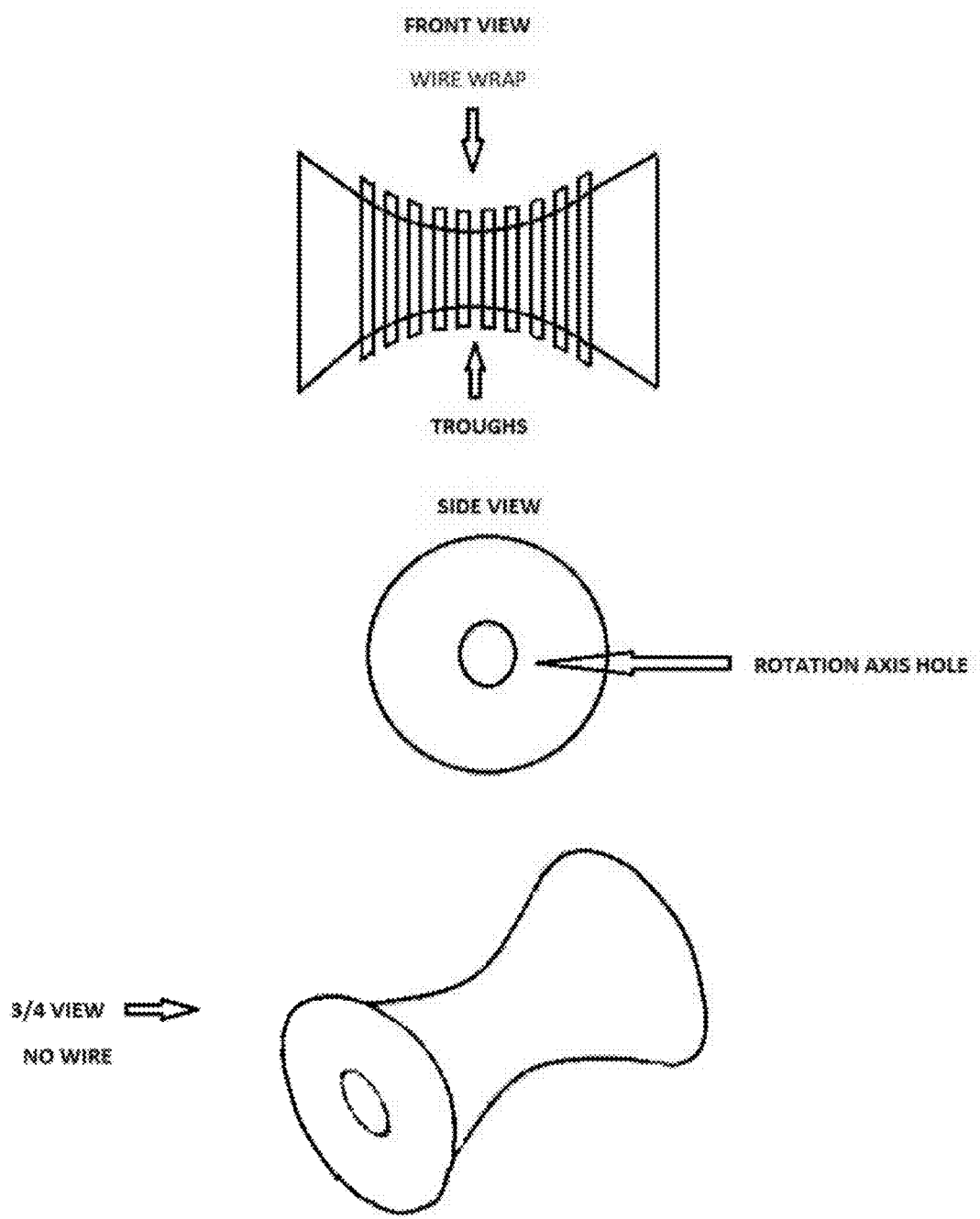
FIG. 1 schematically shows a device for applying a quantity of liquid to a substrate surface.

Described herein are devices and methods for applying a quantity of liquid to a substrate surface. The embodiments described herein were born from developing a spool type wheel, similar to a bicycle hub, that has the same radius as the surface of the lens front or back. In certain embodiments, a hard material, such as metal, plastic, or any other applicable material, may be used such that a wire, made of, for example, metal, or plastic or any other applicable material, may be wrapped around a shaped part, including, for example, a toroid or spherical shaped part. In some embodiments, the wire may be wrapped without starting to fall or slide down the surface. As such, the wire begins in the middle, leaving excess wire from the source, in which it is wrapped in one direction until the end, returns back to the middle, and is finished by wrapping the other side.

In some embodiments, once the wheel is completed with the wire, it may be mounted to something to control the coating. The wheel may then be applied to a bench top computer numeric control (CNC) machine, (e.g., one made by Sherline in Carlsbad, Calif.). In some embodiments, the CNC allows the wheel to roll over the curved sunglass lens. In yet another embodiment, this creates an even coated lens when applying material, including liquid crystal, a hard coat solution for sunglass lenses, and other liquid materials. In some embodiments, all materials are applied to the lens in an even manner. In other embodiments, this process may be performed on the back or front surface of any lens. In yet another embodiment, the lens may also be toroidal or spherical, as eyewear can be designed in several different geometries. In some embodiments, the wheel may be made to match any curved surface or designed such that it is other than flat.

In some embodiments, the wheel can roll while coating in either direction or can also be in "stop mode" and drag the material. The instant embodiments describe a tool that can coat a curved surface with precise thickness. In some embodiments, the technique described herein may be achieved by machining a piece of metal or plastic and carving in tiny lines to eliminate the wire wrapping. In other embodiments, the tool described herein may be created by casting a wire wrapped wheel or machined wheel.

In certain embodiments, the device and methods described herein originate from the manner in which microgrooves are held in place on a curved environment that only allows material to pass through the troughs equally on the surface.

In some other embodiments, another device and methods for applying a coating would be to create a radius from a flat substrate and cut microgrooves into the radius (i.e., curved) section. In some embodiments, the determined radius would be the same radius as the substrate that is being coated. In yet another embodiment, this shape is similar to the shape of a comb/scraper but the grooves are not as deep. In certain embodiments, the groove depth determines the thickness of the coating, therefore requiring only a minimum amount of material to pass through. In yet another embodiment, the wire thickness could range between, for example, approximately 0.0001 to approximately 0.0020 thousandths of an inch, including, for example, approximately 0.0002, approximately 0.0003, approximately 0.0004, approximately 0.0005, approximately 0.0006, approximately 0.0007, approximately 0.0008, approximately 0.0009, approximately 0.0010, approximately 0.0011, approximately 0.0012, approximately 0.0013, approximately 0.0014, approximately 0.0015, approximately 0.0016, approximately 0.0017, approximately 0.0018, approximately 0.0019, and approximately 0.0020. This same technique could be machined or wire wrapped onto a flat piece of metal or plastic with a matching radius. In some embodiments, the same thing is achieved as a curved surface with microgrooves and a coating may be applied.

The radius for a lens curve can vary, for example, the radius may have a range of approximately 1-4 inches, including 1 inch, 2 inches, 3 inches and 4 inches. The hub may have a substantially similar curve.

FIG. 1 schematically shows a device for applying a quantity of liquid to a substrate surface having a predetermined curvature. The device includes a roller which may have a top end, a bottom end and an applicator surface. The applicator surface may define an axis of rotational symmetry passing through both the top and bottom ends. The applicator surface may also be sized and shaped to be complementary to the predetermined curvature of the substrate surface.

The device may also include a wire. At least a portion of the wire may be in contact with the applicator surface over a portion of the applicator surface. The wire may be helically wound about the axis of rotational symmetry of the applicator. The pitch of the helix may be such that successive turns of the wire are in direct contact with one another covering the portion of the applicator surface. The wire may have a cross-section shaped such that the wire defines grooves ("micro-grooves") where successive turns contact one another.

The surface to which the liquid is applied may be concave or convex, while the complementary surface on the applicator may be convex or concave respectively. For example, the curvature of either the surface to which the liquid is applied, or the complementary surface of the applicator, may be ellipsoidal, prolate spheroidal, oblate spheroidal, spherical or toroidal.

The cross-section of the wire may be circular, so that when successive turns of the helically wound wire contact one another, a plurality of cusp-shaped grooves is formed between the turns.

The roller may be metal, rubber or any other suitable material. The applicator surface of the roller may define a plurality of grooves. The grooves may be etched, scratched, or otherwise imparted directly onto the applicator surface, or the grooves may be formed between successive turns of a helically wound wire.

Liquid may be applied to a substrate surface using the device by depositing the liquid onto the substrate surface, positioning the device on the substrate surface so that the complementary applicator surface fully seats on the substrate surface, and dragging or rolling the device over the substrate surface, thereby distributing the liquid over a portion of the substrate surface.

Figure 2:
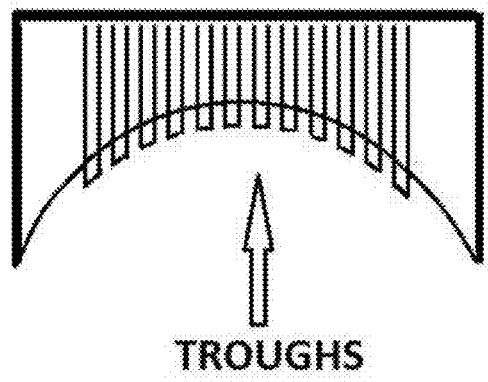
FIG. 2 schematically shows a different device for applying a quantity of liquid to a substrate surface.
Figure 2:
Figure 3:
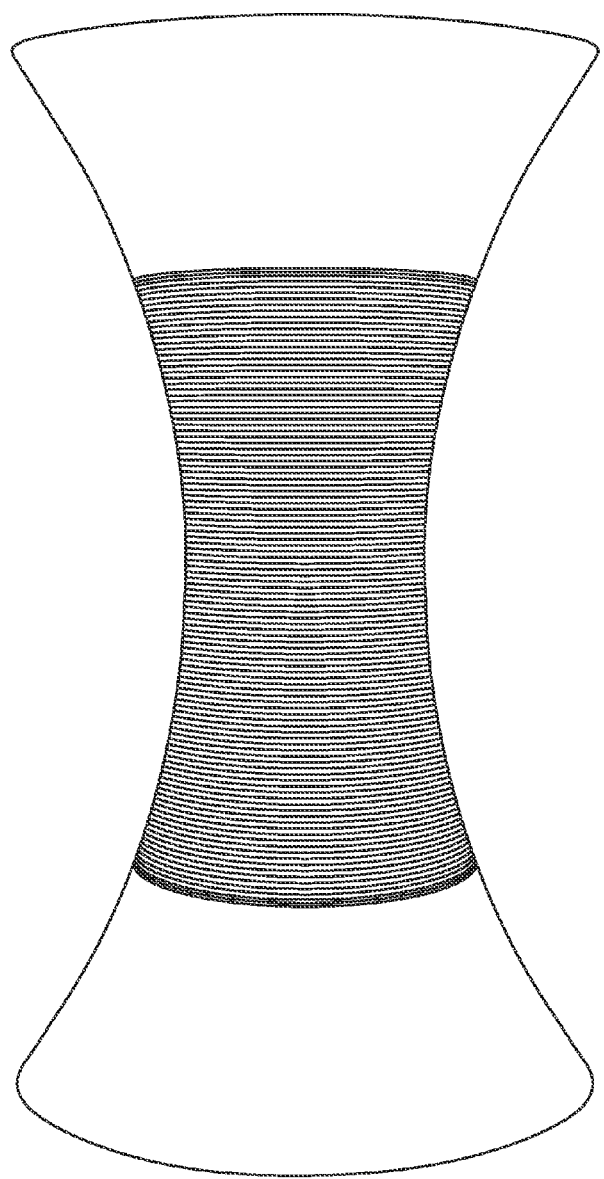
FIGS. 3 and 4 are photographs of one example of the device shown schematically in FIG. 1.
Figure 4:
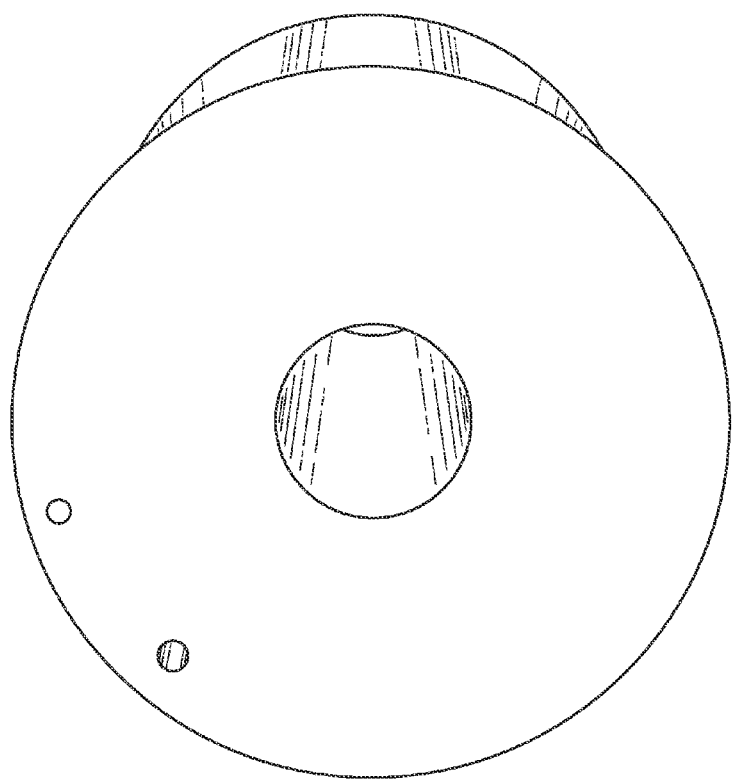

FIG. 2 schematically shows a different device for applying a quantity of liquid to a substrate surface. The device may have a first side and a second side. The first side may be opposed to the second side so that the two sides meet along an applicator edge. The applicator edge may define a plurality of grooves. The applicator edge may be sized and shaped to be complementary to a predetermined curvature of the substrate surface.

Liquid may be applied to a substrate using the device of FIG. 2, in much the same way as the device of FIG. 1: liquid may be deposited on the substrate surface; the device may be positioned so that the applicator edge is fully seated on the substrate surface; and the device may be dragged across the substrate surface, thereby distributing the liquid over a portion of the substrate surface.

EXAMPLES

Coating Process

A machine shop was contracted to make a part from a drawing out of a hard block of metal to the shape of a predetermined radius. The shape of the part was a radius close to in a range of 4 base to 10 base curve. In some other embodiments, the radius of the device is 2.6 inches and the width is about 3.2 inches.

The thickness in the middle was about 1.5 inches and protruded ends were approximately 2.105 inches thick. The part had a hole drilled in the center ½ inch, to allow it to rotate on axis.

The metal part was then wrapped using 0.0010 speaker wire purchased from Radio Shack, Yuma, Ariz. The wrap started in the middle leaving excess wire for the outer end. The wire could not be wrapped starting at one end, because the wire tends to slip down the protruded shoulder. The wire was wrapped from center to end, then using the excess wire to wrap the other side. The wire was attached at each end to keep from unraveling.

The wire wrapped part would then slide onto a metal shaft approximately half inch round. The part was attached to the spindle on a Sherline bench top CNC machine and the spindle was rotated 45 degree's to sit in a horizontal position. A special fixture was machined from aluminum block and lined with holes for a vacuum line. A black rubber material thickness 0.0030 was placed on the fixture to protect the lens from scratching and creating an air tight seal. Once the lens was on the fixture, the vacuum held the lens in place.

A polycarbonate sunglass lens was purchased from "Gentex" Corporation in Carbondale Pa. to conduct the test. Before placing the lens on the fixture, the lens was washed in dionized water for five minutes. The 3 inch diameter lens with an approximately 2.600 inch radius was placed on the vacuum fixture. The CNC table was controlled by a computer attached to the machine.

The Gentex 8 base lens blank was subjected to a corona treatment, which creates a static charge to promote coating adhesion. The corona was applied to the entire surface of the lens using approximately 10,000 volts.

The Sherline CNC was previously programmed to take the wire wrapped part and roll it over the surface of the lens with precision. This movement was done by the lens fixture being held by a rotary table called the A axis movement. The A axis can rotate in a circle motion and can index the part using computer software called G code. The spindle was considered the X axis and could only move up and down. The Y movement went left and right all being controlled by the computer.

For the purpose of the test, a small syringe was filled with a liquid crystal dye supplied by University of Reno, Nev. Two drops of liquid crystal were placed at the edge of the lens top surface and the wire wrapped wheel attached to the spindle, the spindle came down, rolled over the lenses, and touched the surface of the lens and rolled over the entire substrate, pushing the liquid crystal material through the small grooves (also referred to herein as, for example, microgrooves) created by the wire wrapped wheel. Once the coating was applied, the lens was dipped in Barium Chloride to turn the water base liquid crystal into a solid film.

The lens was then rinsed in deionized water to remove excessive salt from the Barium bath.

The lens was then placed in an oven at 200 degree's for 30 minutes for curing time.

The lens was then subject to a hard coat treatment to prevent scratching.

Results

The lens was then tested for polarization and thickness. The thickness was 22 microns thick and 99% polarization efficiency.

Hard Coat Material

The same process was applied using a hard coat material instead of liquid crystal and had the same results in even thickness of 22 microns.

Forward and Backwards Wheel in Motion

The same process was tried turning the wire wrapped wheel in motion both forward and backwards to see if it effected the quality of the finish. The same results were achieved in a quality even coating producing 22 microns thickness. It was also tested with the wheel in non turning position and produced the same thickness of 22 microns.

Machining the Grooves into the Metal or Plastic Wheel

Another process of manufacturing the wrapped wheel was machining the grooves into the metal or plastic wheel. The machined grooves made the part less messy to clean and worked as successfully as the wire wrapped part.

Hard Plastic

The same method of making was demonstrated on hard plastic instead of aluminum and achieved the same results. The metal had longer life due to the softer plastic material seem to wear down faster, especially when the wheel was not rotated and only dragged across the surface of the curve.

I claim:

1. A device for applying a quantity of liquid to a lens, the lens having a predetermined convex curvature, the device comprising:
    a roller having: a top end; a bottom end; and an applicator surface defining an axis of rotational symmetry passing through both the top and bottom ends of the roller, wherein the applicator surface is concave and sized and shaped to be complementary in size and shape to the lens such that the predetermined convex curvature of the lens and the concave applicator surface have an equal radius;
    a wire, at least a portion of which is in contact with a portion of the applicator surface, wherein the wire is helically wound about the axis of rotational symmetry of the roller such that successive turns of the wire are in direct contact with one another and form grooves where the successive turns contact one another; and
    a computer numeric control machine attached to the roller, configured to control the application of the quantity of liquid from the roller to the lens.

2. The device of claim 1, wherein the cross-section of the wire is circular.

3. The device of claim 1, wherein the roller is metal.

4. The device of claim 1, wherein the roller is rubber.

5. A method for applying a quantity of liquid to a lens surface having a predetermined curvature with the device of claim 1, the method comprising: depositing the quantity of liquid on the lens surface; positioning the roller of the device of claim 1 on the lens surface so that the applicator surface fully seats on the lens surface; and rolling the roller over the lens surface, thereby distributing the quantity of liquid over a portion of the lens surface.

6. A device for applying a quantity of liquid to a surface of a lens, the lens having a predetermined convex curvature, the device comprising:
    a roller having: a top end; a bottom end; and an applicator surface that defines an axis of rotational symmetry passing through both the top and bottom ends of the roller; wherein the applicator surface is concave and sized and shaped to be complementary in size and shape to the lens such that the predetermined convex curvature of the lens surface and the concave applicator surface have an equal radius; further wherein the applicator surface comprises microgrooves;
    a lens fixture configured to support the lens during the application of the quantity of liquid to a surface of the lens; and
    a computer numeric control machine attached to the roller, configured to control the application of the quantity of liquid from the roller to the surface of the lens.

7. The device of claim 6, wherein the microgrooves are defined by a wire and are formed where successive turns of the wire contact one another, wherein at least a portion of the wire is in contact with the applicator surface over a portion of the applicator surface; and is helically wound about the axis of rotational symmetry of the applicator surface with a helical pitch such that the successive turns of the wire are in direct contact with one another covering the portion of the applicator surface.

8. The device of claim 6 wherein the liquid to be applied onto the lens surface is a liquid crystal.

9. The device of claim 6, wherein the lens surface having the predetermined convex curvature is spherical.

10. The device of claim 1 wherein the liquid to be coated onto the lens is a liquid crystal.

11. The device of claim 1, wherein the lens surface having the predetermined convex curvature is spherical.

12. The method of claim 5, wherein the rolling of the roller over the lens surface is controlled by the computer numeric control machine of claim 1.

13. The method of claim 5, wherein the lens is held in place during the process by a lens fixture.

\* \* \* \* \*